(12) United States Patent
Shibata et al.

(10) Patent No.: US 8,565,594 B2
(45) Date of Patent: Oct. 22, 2013

(54) OPENING/CLOSING COVER MECHANISM

(75) Inventors: Seiya Shibata, Hirakata (JP); Yukiya Maeda, Shijonawate (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 0 days.

(21) Appl. No.: 13/558,613

(22) Filed: Jul. 26, 2012

(65) Prior Publication Data

US 2013/0025210 A1      Jan. 31, 2013

(30) Foreign Application Priority Data

Jul. 28, 2011   (JP) .................................. 2011-165103

(51) Int. Cl.
*G03B 17/02*   (2006.01)
*B65D 45/00*   (2006.01)

(52) U.S. Cl.
USPC .......................................... 396/539; 220/315

(58) Field of Classification Search
USPC ............... 396/535, 536, 538–539; 455/575.1, 455/575.4; 348/373, 374; 220/315, 326; 340/7.63

See application file for complete search history.

(56) References Cited

U.S. PATENT DOCUMENTS 5,193,707 A  *  3/1993  Mizumura ..................... 220/326

FOREIGN PATENT DOCUMENTS

JP   2008-174296 A   7/2008
JP   2009-163927 A   7/2009

* cited by examiner

*Primary Examiner* — W B Perkey
*Assistant Examiner* — Minh Phan
(74) *Attorney, Agent, or Firm* — Westerman, Hattori, Daniels & Adrian, LLP

(57) ABSTRACT

In an opening/closing cover mechanism, an opening/closing cover is provided with a slidable plate in such a manner as to freely make a reciprocating motion in one direction. The slide plate slides in the one direction in the state in which the opening/closing cover is closed, thereby locking the opening/closing cover when the slide plate is at locked position. A cam mechanism is disposed in an opposing portion defined between an opening edge of an accommodation chamber and an outer peripheral edge portion of the opening/closing cover, both of the edges being faced with each other in the state in which the opening/closing cover is closed, to function when the slide plate slides in the one direction in the state in which the opening/closing cover is closed. The cam mechanism allows a pressing force to act on the opening/closing cover along an axial direction of a hinge axis.

7 Claims, 11 Drawing Sheets

F I G. 1 6
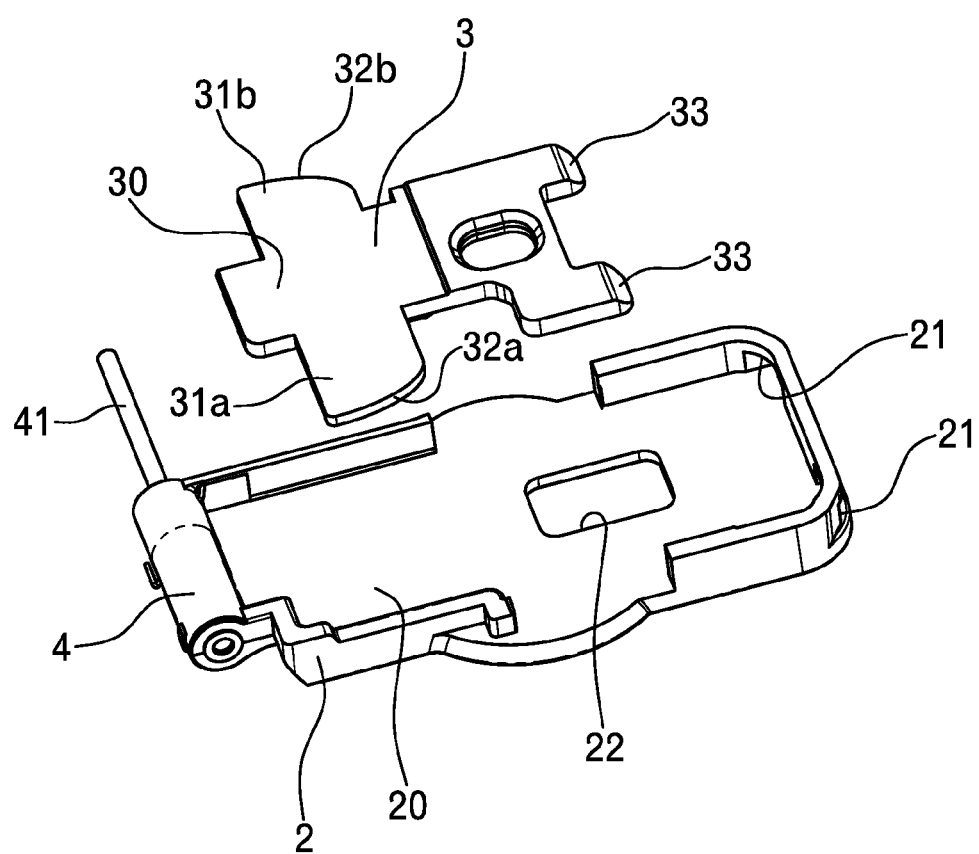

OPENING/CLOSING COVER MECHANISM

CROSS-REFERENCE TO RELATED APPLICATIONS

This patent application is based upon and claims the benefit of priority from Japanese Patent Application No. 2011-165103, the entire contents of which are incorporated herein by reference.

BACKGROUND OF THE INVENTION

1. Field of the Invention

The present invention relates to an opening/closing cover mechanism for opening or closing an accommodation chamber, in which objects such as a battery and a memory card are housed, in an electronic apparatus such as a digital camera.

2. Description of Related Art

Conventionally, in a digital camera, as shown in FIG. 17, an accommodation chamber 95 for a battery 97 and an accommodation chamber 96 for a memory card 98 are formed in a rectangular housing 9, and further, an opening/closing cover 91 for opening or closing the accommodation chambers 95 and 96 is disposed in a manner openable through a slidable hinge 92.

When the opening/closing cover 91 slides in the state in which the opening/closing cover 91 is closed, an engagement hook 93 projecting from the tip end of the opening/closing cover 91 is hooked on an engagement receiving portion 94 disposed at opening edges of the accommodation chambers 95 and 96 in the housing 9, so that the opening/closing cover 91 is locked at a closure position. Here, the opening/closing cover 91 is elastically biased by a spring (not shown) from the closure position toward an opening direction, as required.

In the conventional opening/closing cover mechanism, a clearance (of, e.g., about 0.5 mm) for smoothly opening or closing the opening/closing cover 91 is formed between the opening edges of the accommodation chambers 95 and 96 formed in the housing 9 and an outer peripheral edge portion of the opening/closing cover 91 at the closure position. Further, an axial play for permitting the opening/closing cover 91 to be moved along a hinge axis within the range of the clearance is given to the hinge 92 in the opening/closing cover 91.

With the opening/closing cover mechanism, even in a situation in which a side edge of the opening/closing cover 91 is scratched by the opening edge of the housing 9 in a process in which the opening/closing cover 91 is opened from the closure position, the opening/closing cover 91 is moved in an axial direction, thereby avoiding such a situation, whereby the opening/closing cover 91 can be opened without any scratch.

However, in the opening/closing cover mechanism, the large clearance of about 0.5 mm is defined around the opening/closing cover so as to smoothly open the opening/closing cover. Therefore, the opening/closing cover has a problem about backlash in a hinge axial direction in the closed state.

SUMMARY OF THE INVENTION

An opening/closing cover mechanism according to the present invention includes:

a housing 1 having an accommodation chamber 11 which accommodates an object therein;

an opening/closing cover 2 pivotally supported at a base end portion thereof by a hinge axis 41 so as to openably close the accommodation chamber 11;

a slide plate 3 disposed in the opening/closing cover 2 in such a manner as to freely make a reciprocating motion along one direction so as to freely slide, the slide plate sliding in the one direction in the state in which the opening/closing cover 2 is closed, to lock the opening/closing cover 2 at a closure position; and a cam mechanism disposed in a facing portion defined between an opening edge of the accommodation chamber 11 and an outer peripheral edge portion of the opening/closing cover 2, both of the edges being faced with each other in the state in which the opening/closing cover 2 is closed, to function when the slide plate 3 slides in the one direction in the state in which the opening/closing cover 2 is closed, the cam mechanism being equipped with function of acting a pressing force on the opening/closing cover 2 in an axial direction of the hinge axis 41.

BRIEF DESCRIPTION OF THE DRAWINGS

FIG. 16 is an exploded perspective view showing the opening/closing cover and the slide plate.

DETAILED DESCRIPTION OF THE PREFERRED EMBODIMENTS

Two embodiments, in which the present invention is applied to a camera, will be specifically described below with reference to the drawings.

First Embodiment

Figure 1:
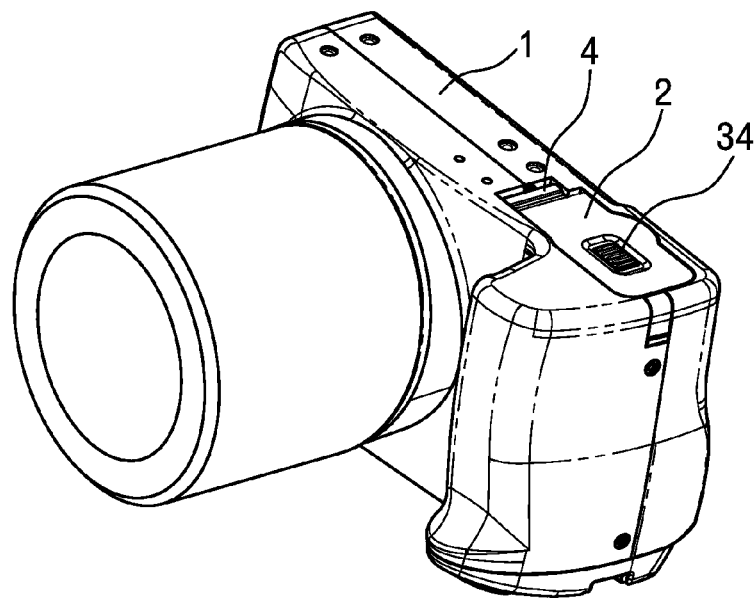
FIG. 1 is a perspective view showing an opening/closing cover in a camera in a closed state in a first embodiment according to the present invention.
Figure 2:
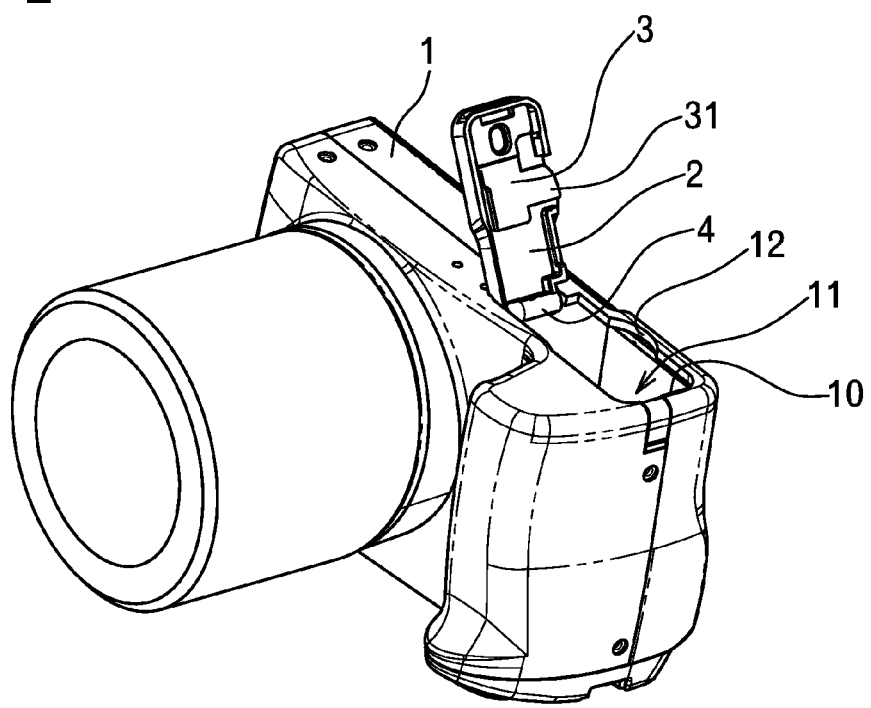
FIG. 2 is a perspective view showing the opening/closing cover in the camera in an open state.

As shown in FIGS. 1 and 2, a camera according to a first embodiment of the present invention is provided with a housing 1 formed into a substantially rectangular shape, and the housing 1 has an accommodation chamber 11 which accommodates a battery (not shown).

The accommodation chamber 11 in the housing 1 can be opened or closed between a closure position shown in FIG. 1 and an open position shown in FIG. 2 by an opening/closing cover 2 that is pivotally supported at a base end portion thereof by a hinge mechanism 4. A slide plate 3 is disposed at the rear surface of the opening/closing cover 2, for locking the opening/closing cover 2 at the closure position. As shown in FIG. 1, the slide plate 3 has an operating knob 34 that can be operated outside of the housing 1.

Incidentally, the hinge mechanism 4 incorporates therein a torsion spring (not shown) for elastically biasing the opening/closing cover 2 from the closure position shown in FIG. 1 to the open position shown in FIG. 2.

Figure 8:
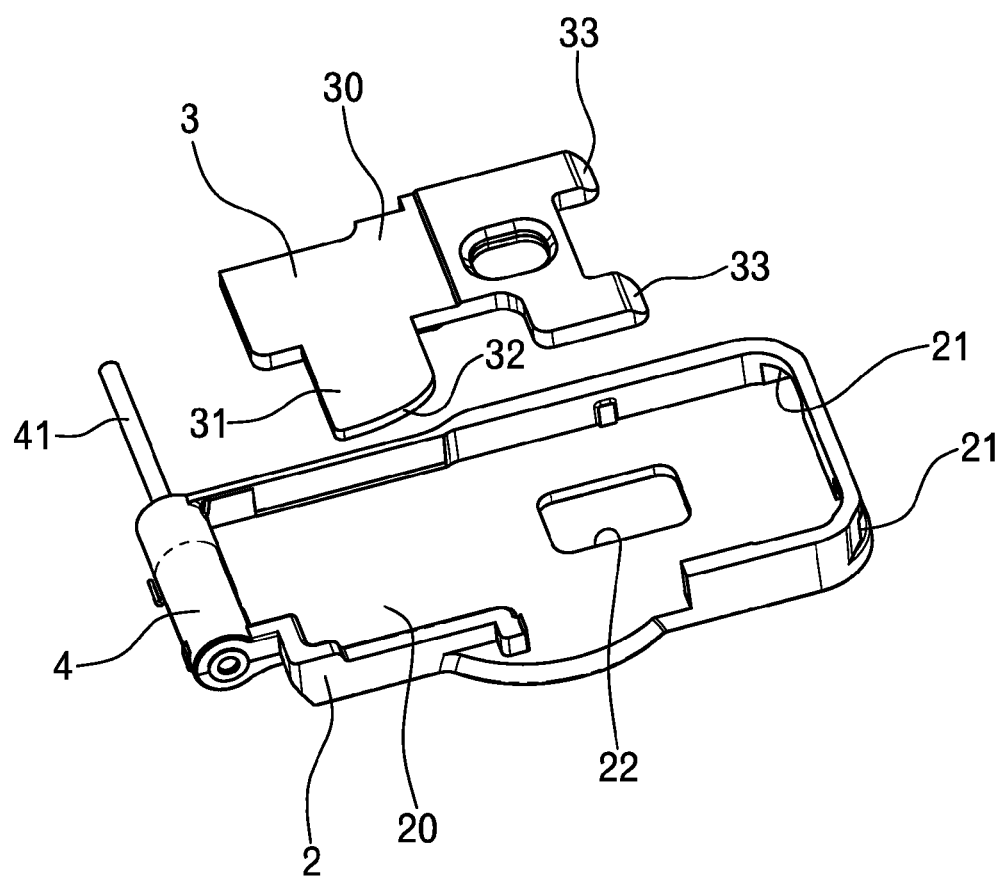
FIG. 8 is an exploded perspective view showing the opening/closing cover and the slide plate.

As shown in FIG. 8, the opening/closing cover 2 is provided with a substantially rectangular cover body 20, and further, the hinge mechanism 4 having a hinge axis 41 is connected to a longitudinal base end portion of the cover body 20. The cover body 20 has an opening 22 exposing the operating knob 34 to the outside. Moreover, the cover body 20 has a pair of slits 21 and 21 bored at the tip end thereof.

The slide plate 3 is provided with a substantially rectangular flat plate 30, which has a blade piece 31 projecting from either side thereof in a width direction. The blade piece 31 has a slide-contact surface 32 arcuately curved at the tip end thereof. Moreover, the flat plate 30 has a pair of engagement pieces 33 and 33 projecting from the tip end thereof in such a manner as to correspond to the pair of slits 21 and 21 in the opening/closing cover 2.

Figure 7:
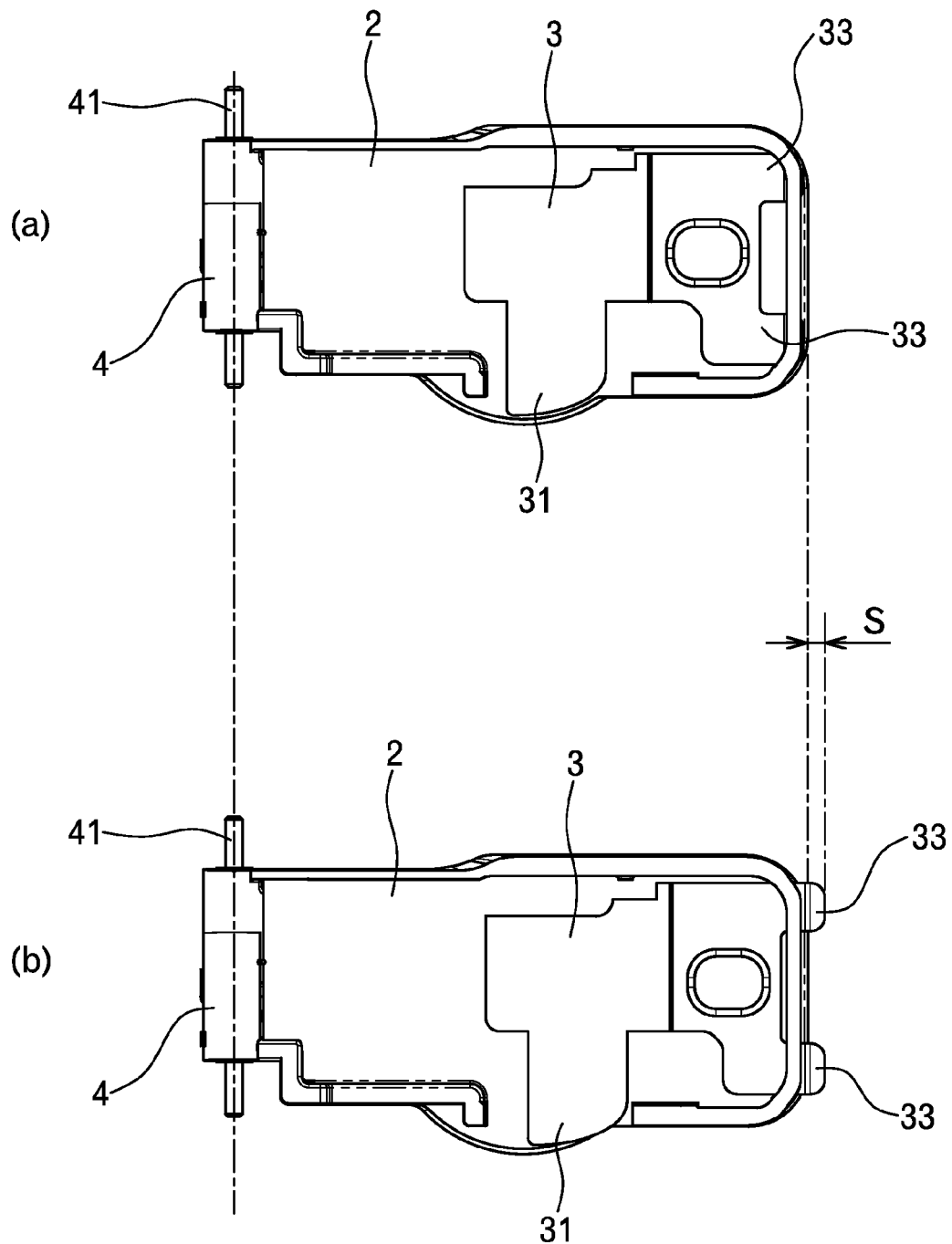
FIG. 7 is a back view showing the opening/closing cover and the slide plate in a slide operation of the slide plate.

The slide plate 3 engages with respect to the rear surface of the opening/closing cover 2 in such a manner as to freely slide in a direction perpendicular to the hinge axis 41 of the hinge mechanism 4, and further, cannot be relatively moved in a direction parallel to the hinge axis 41. The slide plate 3 slides from an unlocked position shown in FIG. 7(a) to a locked position shown in FIG. 7(b), and thus, the pair of engagement pieces 33 and 33 of the slide plate 3 penetrates the pair of slits 21 and 21, to thus project from the front end of the opening/closing cover 2 by a distance S.

As shown in FIG. 2, a slide-contact receiving surface 12 arcuately curved is formed at an opening edge 10 of the accommodation chamber 11 in the housing 1, and this position cause a slide-contact receiving surface 12 to face the blade piece 31 of the slide plate 3 by closing the opening/closing cover 2.

Figure 3:
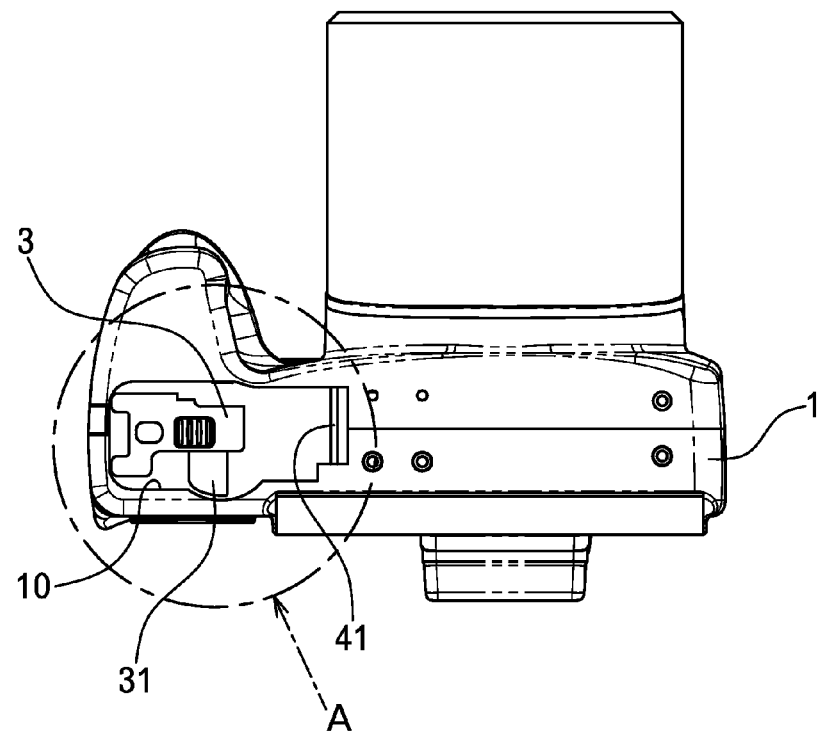
FIG. 3 is a bottom view showing an unlocked state of a slide plate, the opening/closing cover being not shown.
Figure 4:
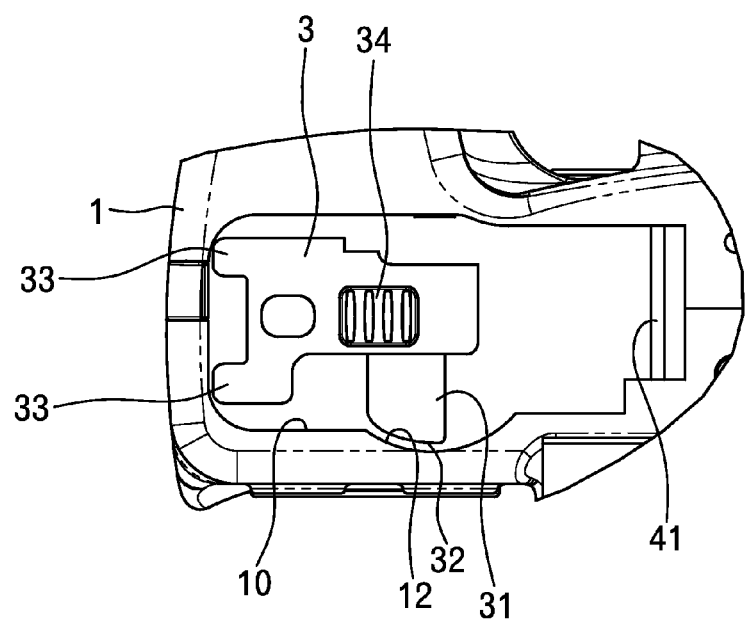
FIG. 4 is an enlarged bottom view showing a part A of FIG. 3.
Figure 5:
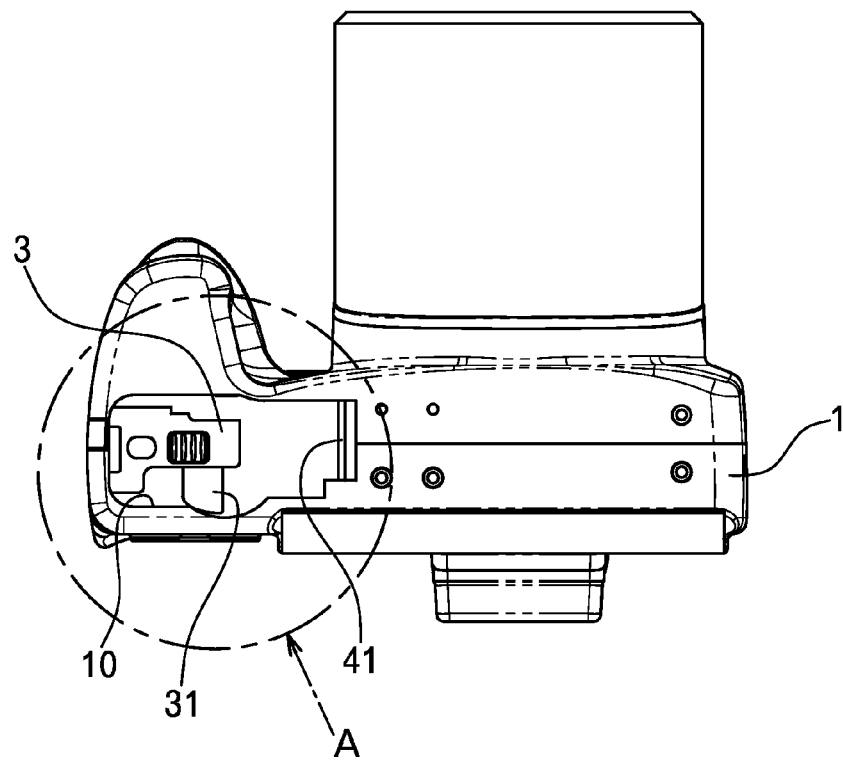
FIG. 5 is a bottom view showing a locked state of the slide plate, the opening/closing cover being not shown.
Figure 6:
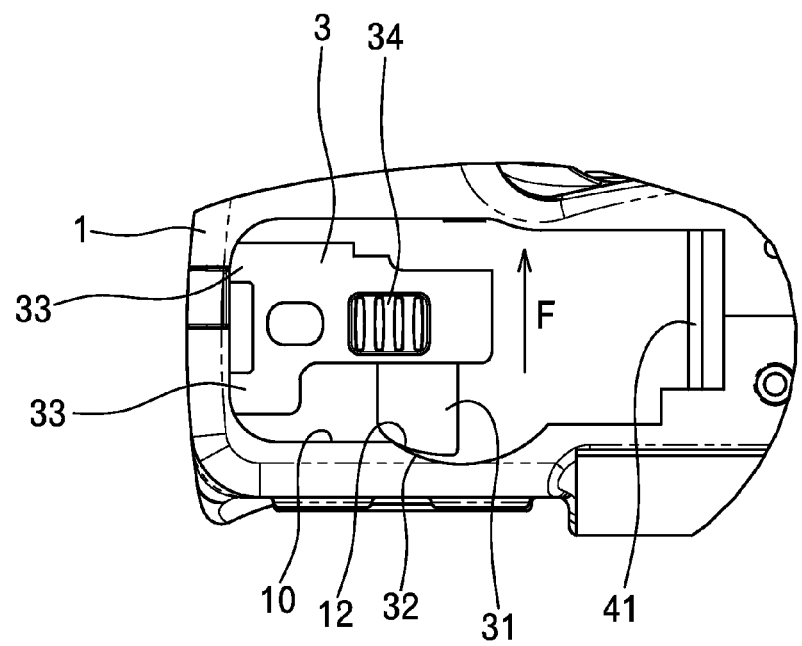
FIG. 6 is an enlarged bottom view showing a part A of FIG. 5.

As shown in FIGS. 3 and 4, the slide-contact surface 32 of the blade piece 31 and the slide-contact receiving surface 12 of the housing 1 are separated from each other when the slide plate 3 is at the unlocked position. In contrast, as shown in FIGS. 5 and 6, the slide-contact surface 32 of the blade piece 31 is brought into slide-contact with the slide-contact receiving surface 12 of the housing 1 in a process in which the slide plate 3 is moved from a position immediately before the lock to the locked position. Consequently, the slide-contact surface 32 of the blade piece 31 receives a cam force from the slide-contact receiving surface 12 of the housing 1.

Here, the slide-contact surface 32 of the blade piece 31 and the slide-contact receiving surface 12 of the housing 1 are inclined with respect to the slide direction of the slide plate 3. A component of force F generated according to the inclination acts to press the opening/closing cover 2 in one direction along the hinge axis 41.

As a consequence, the opening/closing cover 2 is slightly moved along the hinge axis 41. The side edge of the opening/closing cover 2 is held at a position in contact with the opening edge 10 of the housing 1 when the slide plate 3 is at the locked position. Additionally, the pair of engagement pieces 33 and 33 of the slide plate 3 is inserted inside of the opening edge 10 of the housing 1, so that the opening/closing cover 2 is locked at the closure position.

In this state, the opening/closing cover 2 is held at a predetermined position along the hinge axis 41, and therefore, a backlash does not occur because the opening/closing cover 2 has no play in the direction along the hinge axis 41.

In opening the opening/closing cover 2, the slide plate 3 slides in a reverse direction, and then, the pair of engagement pieces 33 and 33 is unlocked. The slide of the slide plate 3 separates the slide-contact surface 32 of the blade piece 31 from the slide-contact receiving surface 12 of the housing 1. In this manner, the opening/closing cover 2 receives the elastically biasing force in the open direction from the hinge mechanism 4, and thus, is automatically opened from the closure position shown in FIG. 1 to the open position shown in FIG. 2.

Second Embodiment

Figure 9:
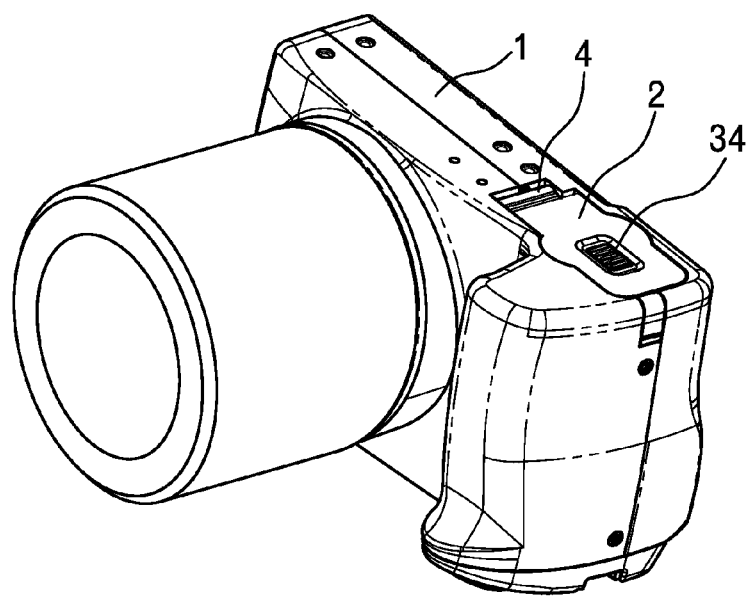
FIG. 9 is a perspective view showing an opening/closing cover in a camera in a closed state in a second embodiment according to the present invention.
Figure 10:
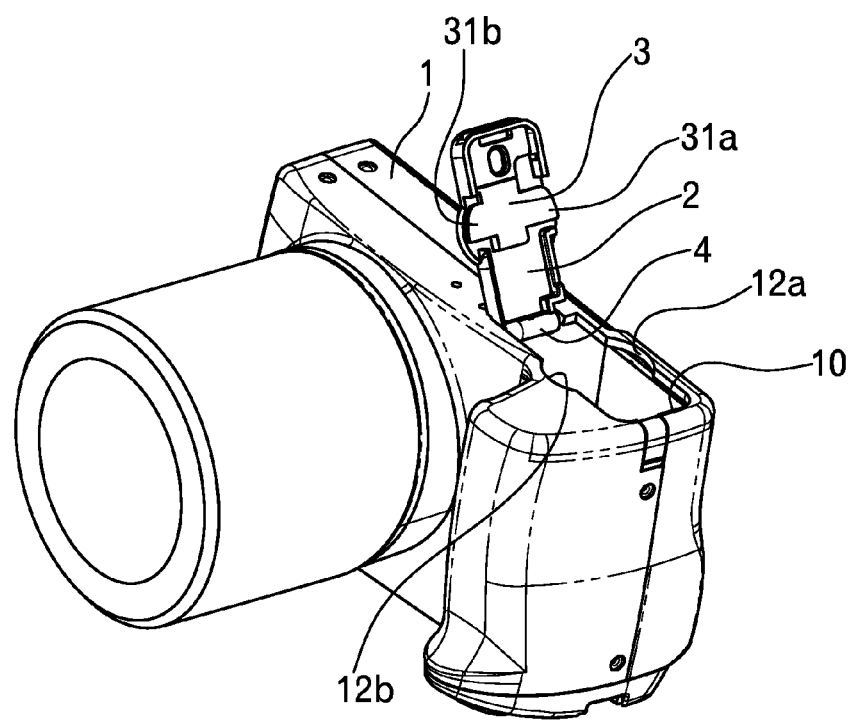
FIG. 10 is a perspective view showing the opening/closing cover in the camera in an open state.

As shown in FIGS. 9 and 10, a camera according to a second embodiment of the present invention is provided with a substantially rectangular housing 1, which has an accommodation chamber 11 which accommodates a battery (not shown).

The accommodation chamber 11 in the housing 1 can be opened or closed between a closure position shown in FIG. 9 and an open position shown in FIG. 10 by an opening/closing cover 2 that is pivotally supported at a base end portion thereof by a hinge mechanism 4. A slide plate 3 is disposed at the rear surface of the opening/closing cover 2, for locking the opening/closing cover 2 when the slide plate 3 is at the locked position. As shown in FIG. 9, the slide plate 3 has an operating knob 34 that can be operated outside of the housing 1.

Incidentally, the hinge mechanism 4 incorporates therein a torsion spring (not shown) for elastically biasing the opening/closing cover 2 from the closure position shown in FIG. 9 to the open position shown in FIG. 10.

As shown in FIG. 16, the opening/closing cover 2 is provided with a substantially rectangular cover body 20, and further, the hinge mechanism 4 having a hinge axis 41 is connected to a longitudinal base end portion of the cover body 20. The cover body 20 has an opening 22 exposing the operating knob 34 to the outside. Moreover, the cover body 20 has a pair of slits 21 and 21 bored at the tip end thereof.

The slide plate 3 is provided with a substantially rectangular flat plate 30, which has two blade pieces 31a and 31b projecting from both sides thereof in a width direction. The blade pieces 31a and 31b have slide-contact surfaces 32a and 32b arcuately curved, respectively, at the tip ends thereof. Moreover, the flat plate 30 has a pair of engagement pieces 33 and 33 projecting from the tip end thereof in such a manner as to correspond to the pair of slits 21 and 21 in the opening/closing cover 2.

Figure 15:
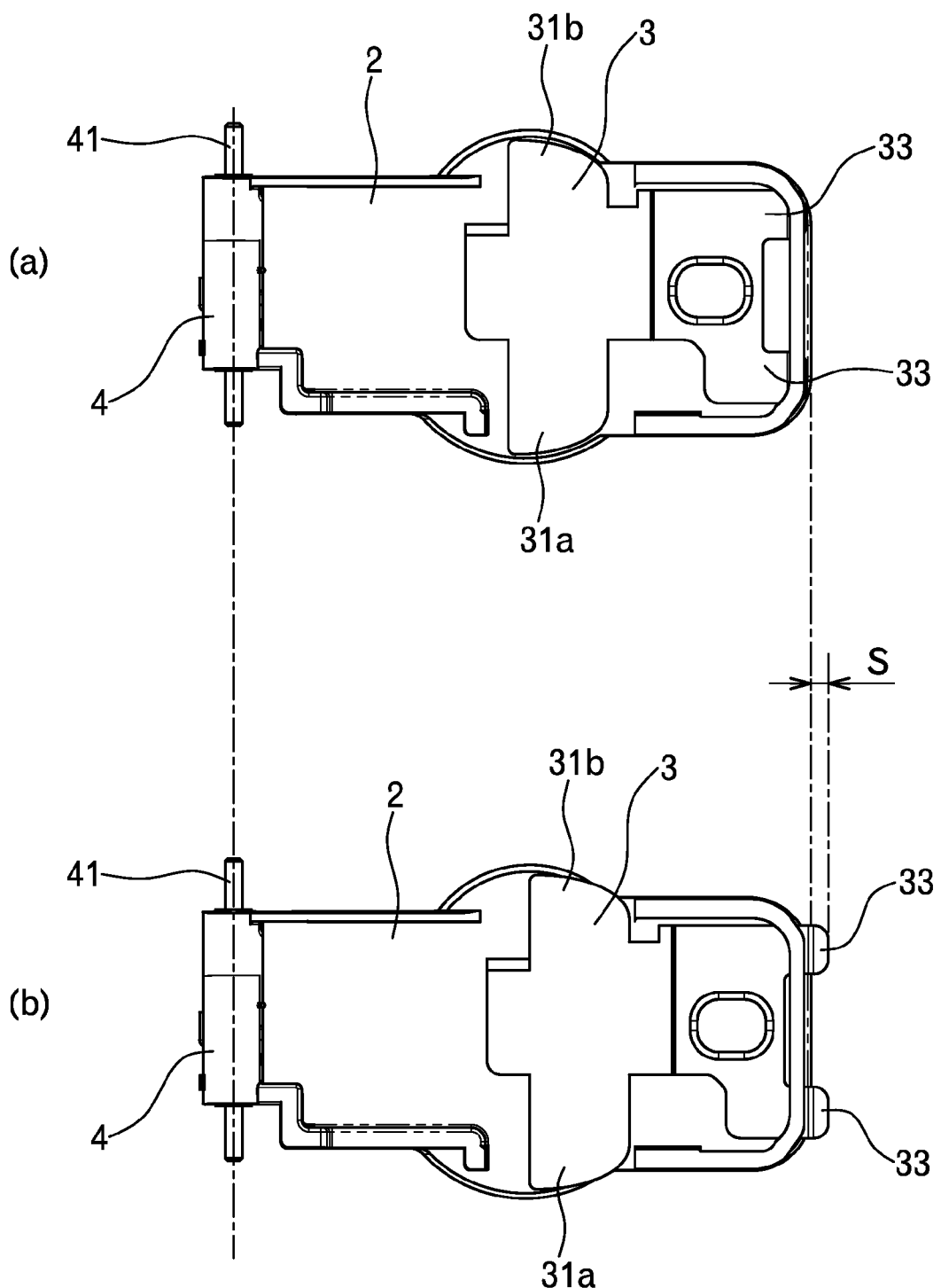
FIG. 15 is a back view showing the opening/closing cover and the slide plate in a slide operation of the slide plate.
Figure 17:
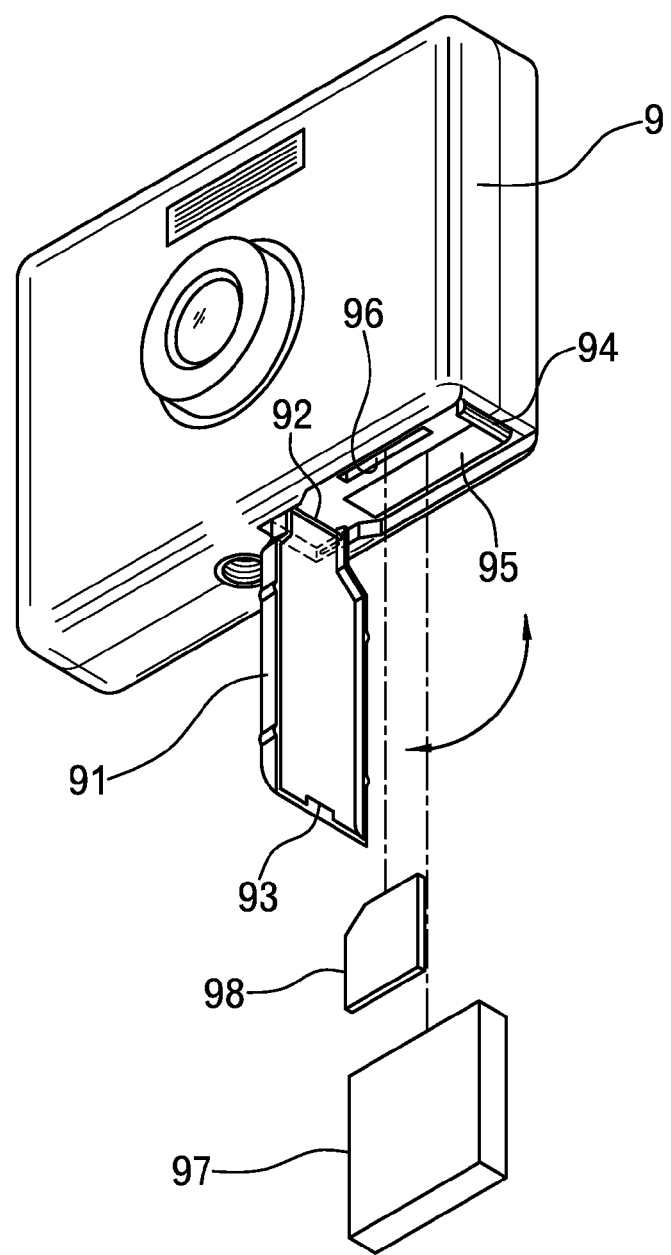
FIG. 17 is a perspective view showing a conventional opening/closing cover mechanism.

The slide plate 3 engages with respect to the rear surface of the opening/closing cover 2 in such a manner as to freely slide in a direction perpendicular to the hinge axis 41 of the hinge mechanism 4, and further, cannot be relatively moved in a direction parallel to the hinge axis 41. The slide plate 3 slides from an unlocked position shown in FIG. 15(a) to a locked position shown in FIG. 15(b), and thus, the pair of engagement pieces 33 and 33 of the slide plate 3 penetrates the pair of slits 21 and 21, to thus project from the front end of the opening/closing cover 2 by a distance S.

As shown in FIG. 10, two slide-contact receiving surfaces 12a and 12b arcuately curved are formed at an opening edge 10 of the accommodation chamber 11 in the housing 1, and this position cause two slide-contact receiving surfaces 12a and 12b to face with the two blade pieces 31a and 31b of the slide plate 3 by closing the opening/closing cover 2.

Figure 11:
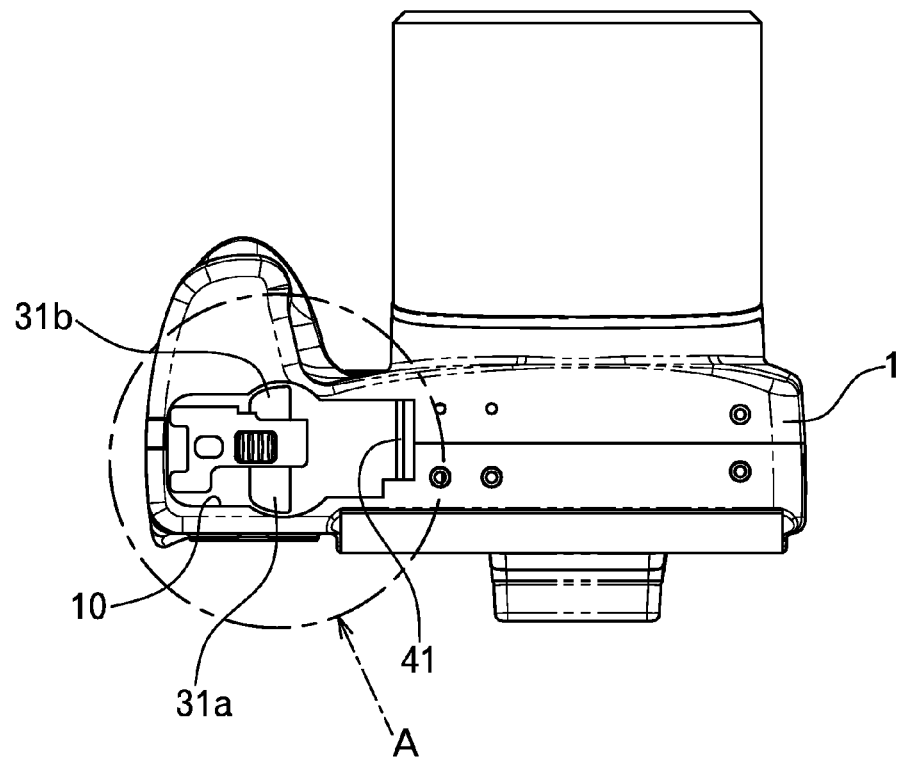
FIG. 11 is a bottom view showing an unlocked state of a slide plate, the opening/closing cover being not shown.
Figure 12:
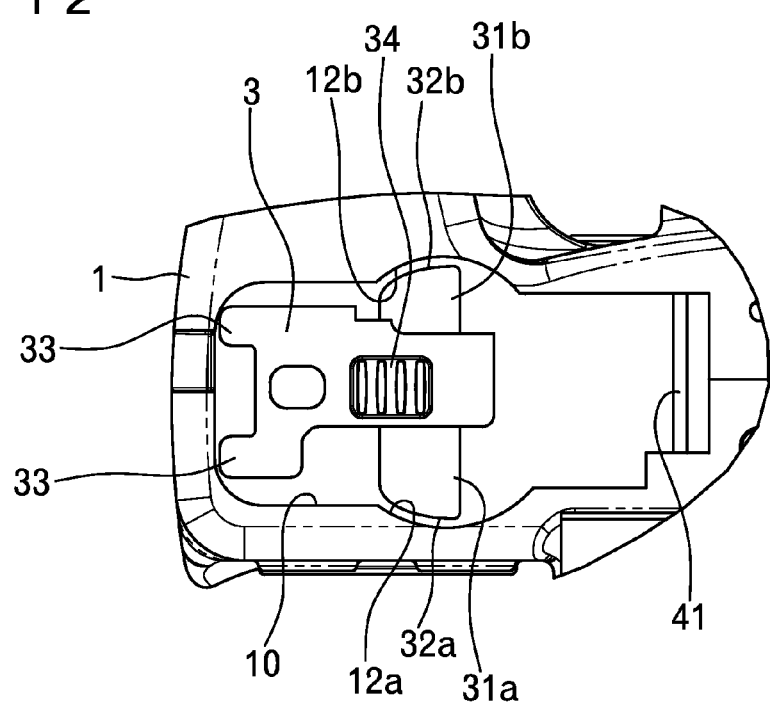
FIG. 12 is an enlarged bottom view showing a part A of FIG. 11.
Figure 13:
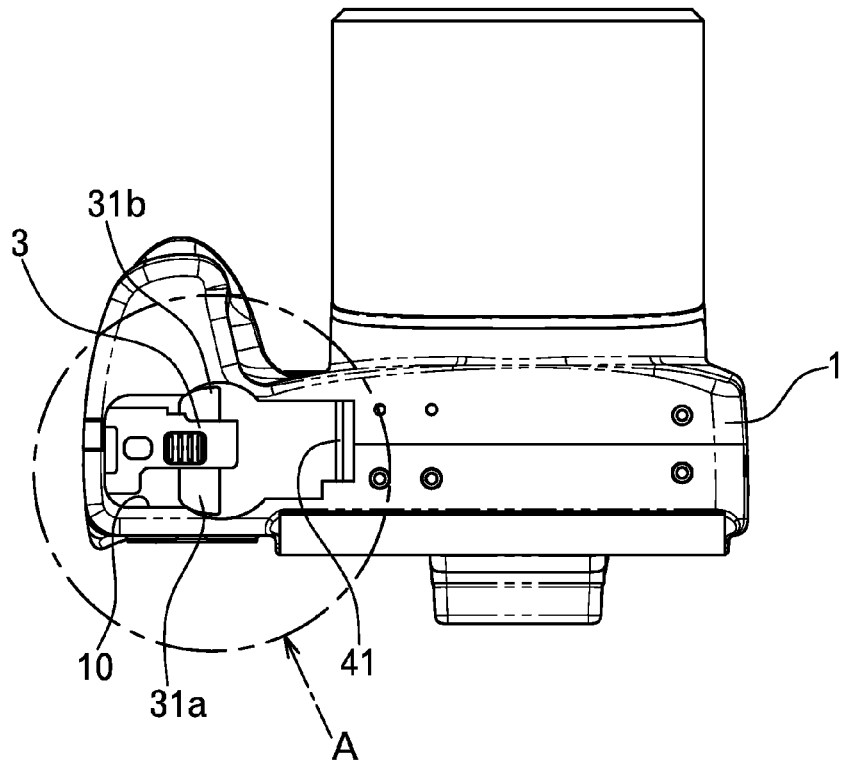
FIG. 13 is a bottom view showing a locked state of the slide plate, the opening/closing cover being not shown.
Figure 14:
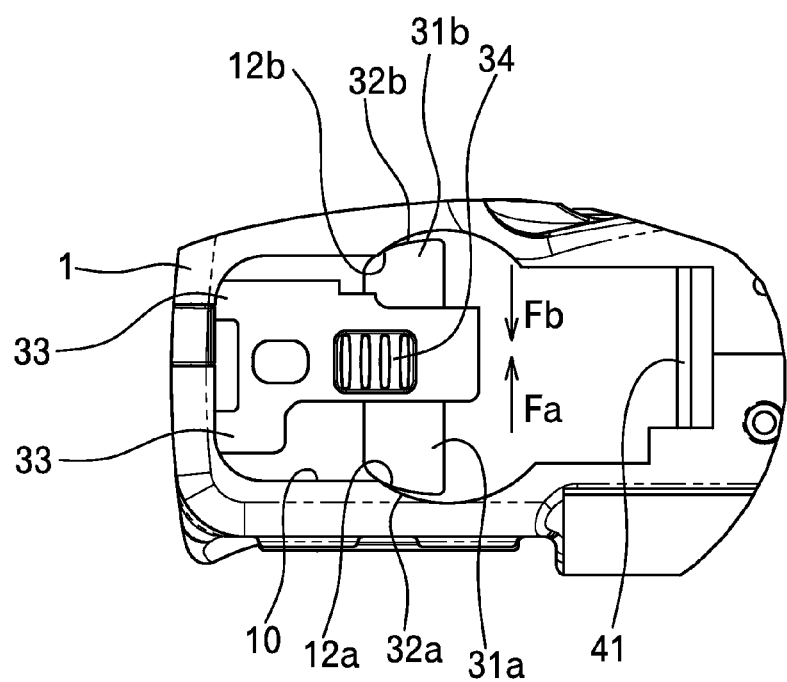
FIG. 14 is an enlarged bottom view showing a part A of FIG. 13.

As shown in FIGS. 11 and 12, the slide-contact surfaces 32a and 32b of the blade pieces 31a and 31b and the slide-contact receiving surfaces 12a and 12b of the housing 1 are separated from each other when the slide plate 3 is at the unlocked position. In contrast, as shown in FIGS. 13 and 14, the slide-contact surfaces 32a and 32b of the blade pieces 31a and 31b are brought into slide-contact with the slide-contact receiving surfaces 12a and 12b of the housing 1 in a process in which the slide plate 3 is moved from a position immediately before the lock to the locked position. Consequently, the slide-contact surfaces 32a and 32b of the blade pieces 31a and 31b receive a cam force from the slide-contact receiving surfaces 12a and 12b of the housing 1.

Here, the slide-contact surfaces 32a and 32b of the blade pieces 31a and 31b and the slide-contact receiving surfaces 12a and 12b of the housing 1 are inclined with respect to the slide direction of the slide plate 3. Components of force Fa and Fb generated according to the inclination act to press the opening/closing cover 2 along the hinge axis 41 in two directions face to each other.

As a consequence, the opening/closing cover 2 is slightly moved along the hinge axis 41. Both of the side edges of the opening/closing cover 2 are held at positions separate from the opening edge 10 of the housing 1 when the slide plate 3 is at the unlocked position. Additionally, the pair of engagement pieces 33 and 33 of the slide plate 3 is inserted inside of the opening edge 10 of the housing 1, so that the opening/closing cover 2 is locked at the closure position.

In this state, the opening/closing cover 2 is held at a predetermined position along the hinge axis 41, and therefore, a backlash does not occur because the opening/closing cover 2 has no play in the direction along the hinge axis 41.

In opening the opening/closing cover 2, the slide plate 3 slides in a reverse direction, and then, the pair of engagement pieces 33 and 33 is unlocked. The slide of the slide plate 3 separates the slide-contact surfaces 32a and 32b of the blade pieces 31a and 31b from the slide-contact receiving surfaces 12a and 12b of the housing 1. In this manner, the opening/closing cover 2 receives the resilient biasing force in the open direction from the hinge mechanism 4, and thus, is automatically opened from the closure position shown in FIG. 9 to the open position shown in FIG. 10.

Here, since both of the side edges of the opening/closing cover 2 are separated from the opening edge 10 of the housing 1, the opening/closing cover 2 is smoothly opened without any scratch on the opening edge 10 of the housing 1.

Incidentally, the configuration of each of the constituent elements according to the present invention is not limited to that in the embodiments. Therefore, various modifications can be made by experts in the technical field without departing from the spirit of the present invention defined in claims. For example, although in the first and second embodiments, the cam mechanism including the slide-contact surface 32 of the blade piece 31 and the slide-contact receiving surface 12 of the housing 1 is provided at either or both of the sides of the slide plate 3, one or two cam mechanisms may be provided at the tip end of the slide plate 3.

What is claimed is:

1. An opening/closing cover mechanism comprising:
   a housing having an accommodation chamber which accommodates an object therein;
   an opening/closing cover pivotally supported at a base end portion thereof by a hinge axis so as to openably close the accommodation chamber;
   a slide plate disposed in the opening/closing cover in such a manner as to freely make an reciprocating motion along one direction so as to freely slide, the slide plate sliding in the one direction in a state in which the opening/closing cover is closed, to lock the opening/closing cover when the slide plate is at the locked position; and
   a cam mechanism disposed in a facing portion defined between an opening edge of the accommodation chamber and an outer peripheral edge portion of the opening/closing cover, both of the edges being faced with each other in the state in which the opening/closing cover is closed, to function when the slide plate slides in the one direction in the state in which the opening/closing cover is closed,
   the cam mechanism being equipped with function of acting a pressing force on the opening/closing cover in an axial direction of the hinge axis.

2. The opening/closing cover mechanism according to claim 1, wherein
   the cam mechanism includes a slide-contact surface formed at the outer peripheral edge portion of the opening/closing cover and a slide-contact receiving surface formed at the opening edge of the accommodation chamber, each of the slide-contact surface and the slide-contact receiving surface being inclined with respect to a slide direction of the slide plate.

3. The opening/closing cover mechanism according to claim 1, wherein
   the cam mechanism is provided on either side in a width direction perpendicular to the slide direction of the slide plate, allowing the pressing force to act on the opening/closing cover in one direction along the hinge axis.

4. The opening/closing cover mechanism according to claim 2, wherein
   the cam mechanism is provided on either side in a width direction perpendicular to the slide direction of the slide plate, allowing the pressing force to act on the opening/closing cover in one direction along the hinge axis.

5. The opening/closing cover mechanism according to claim 1, wherein
   the cam mechanisms are provided on both sides in a width direction perpendicular to the slide direction of the slide plate, allowing the pressing force to act on the opening/closing cover along the hinge axis in two directions face to each other.

6. The opening/closing cover mechanism according to claim 2, wherein
   the cam mechanisms are provided on both sides in a width direction perpendicular to the slide direction of the slide plate, allowing the pressing force to act on the opening/closing cover along the hinge axis in two directions face to each other.

7. The opening/closing cover mechanism according to claim 1, wherein
   the slide plate has an engagement piece projecting therefrom and engaging with the opening edge of the accommodation chamber by sliding the slide plate in the one direction in the state in which the opening/closing cover is closed.

* * * * *